US012226857B2

(12) United States Patent
Kim et al.

(10) Patent No.: US 12,226,857 B2
(45) Date of Patent: Feb. 18, 2025

(54) SECONDARY BATTERY MANUFACTURING PROCESS CARRIER HAVING CARRIER TRANSPORTING TRACK STRUCTURE

(71) Applicant: MPLUS CORP, Cheongju-si (KR)

(72) Inventors: Jong Sung Kim, Seongnam-si (KR); Kang Ho Ko, Yongin-si (KR); Sung Moon Kim, Cheongju-si (KR)

(73) Assignee: MPLUS CORP, Cheongju-si (KR)

( * ) Notice: Subject to any disclaimer, the term of this patent is extended or adjusted under 35 U.S.C. 154(b) by 599 days.

(21) Appl. No.: 17/630,787

(22) PCT Filed: May 25, 2020

(86) PCT No.: PCT/KR2020/006752
§ 371 (c)(1),
(2) Date: Jan. 27, 2022

(87) PCT Pub. No.: WO2020/246741
PCT Pub. Date: Dec. 10, 2020

(65) Prior Publication Data
US 2022/0266398 A1    Aug. 25, 2022

(30) Foreign Application Priority Data

Jun. 4, 2019 (KR) .................. 10-2019-0065770

(51) Int. Cl.
*H01M 50/536* (2021.01)
*B23K 37/04* (2006.01)
(Continued)

(52) U.S. Cl.
CPC .............. *B23K 37/04* (2013.01); *B65G 35/00* (2013.01); *H01M 10/0404* (2013.01);
(Continued)

(58) Field of Classification Search
CPC ............ H01M 10/0404; H01M 50/536; B23K 37/04; F16C 29/045; Y10T 29/53261;
(Continued)

(56) References Cited

U.S. PATENT DOCUMENTS 5,900,030 A * 5/1999 Farmer ............. H01M 10/0404
29/730
2017/0225693 A1* 8/2017 Fenile .................... B65G 9/002

FOREIGN PATENT DOCUMENTS

JP      2012240463 A  * 12/2012 ............ B61B 13/04
KR     1997-000506 A      1/1997
(Continued)

OTHER PUBLICATIONS

Allotta et al, "Modeling and Control of a Full-Scale Roller-Rig for the Analysis of Railway Braking Under Degraded Adhesion Conditions," in IEEE Transactions on Control Systems Technology, vol. 23, No. 1, pp. 186-196, Jan. 2015. (Year: 2015).*

(Continued)

*Primary Examiner* — A. Dexter Tugbang
(74) *Attorney, Agent, or Firm* — NKL LAW; Jae Youn Kim

(57) ABSTRACT

A secondary battery manufacturing process carrier having a carrier transporting track structure is provided. The secondary battery manufacturing process carrier includes: a carrier base; a carrier roller provided at a first side of the carrier base; a rolling member provided at a second side of the carrier base; and a track base on which the carrier base is movably disposed. The carrier base has a first carrier side plate and a second carrier side plate at left and right sides thereof, the first carrier side plate and the second carrier side plate include the carrier roller and the rolling member, respectively, and the carrier roller and the rolling member are configured to be rolled on the track base.

10 Claims, 4 Drawing Sheets

(51) Int. Cl.
  *B65G 35/00* (2006.01)
  *H01M 10/04* (2006.01)
  *F16C 29/04* (2006.01)
(52) U.S. Cl.
  CPC ......... *F16C 29/045* (2013.01); *H01M 50/536* (2021.01); *Y02E 60/10* (2013.01); *Y10T 29/53135* (2015.01)
(58) Field of Classification Search
  CPC ........... Y10T 29/53265; Y10T 29/5313; Y10T 29/53135; B65G 35/00; B65G 9/002; Y02E 60/10
  See application file for complete search history.

(56) References Cited

FOREIGN PATENT DOCUMENTS

| KR | 10-0392878 B1 | 7/2003 |
| KR | 10-0814923 B1 | 3/2008 |
| KR | 10-1188628 B1 | 10/2012 |
| KR | 10-2015-0027689 A | 3/2015 |

OTHER PUBLICATIONS

International Search Report for PCT/KR2020/006752 dated Oct. 7, 2020 (PCT/ISA/210).
Written Opinion for PCT/KR2020/006752 dated Oct. 7, 2020 (PCT/ISA/237).

\* cited by examiner

[Figure 1]
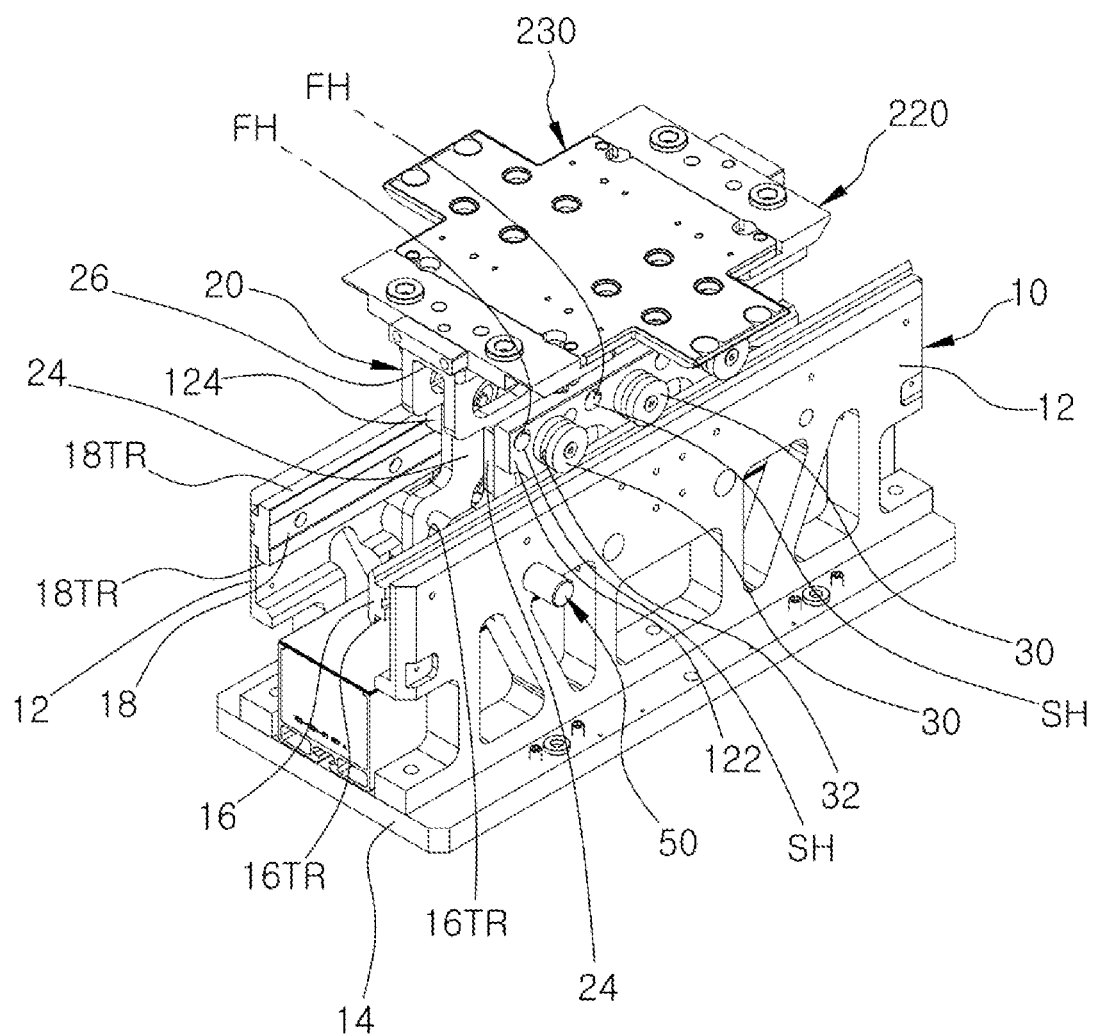

[Figure 2]
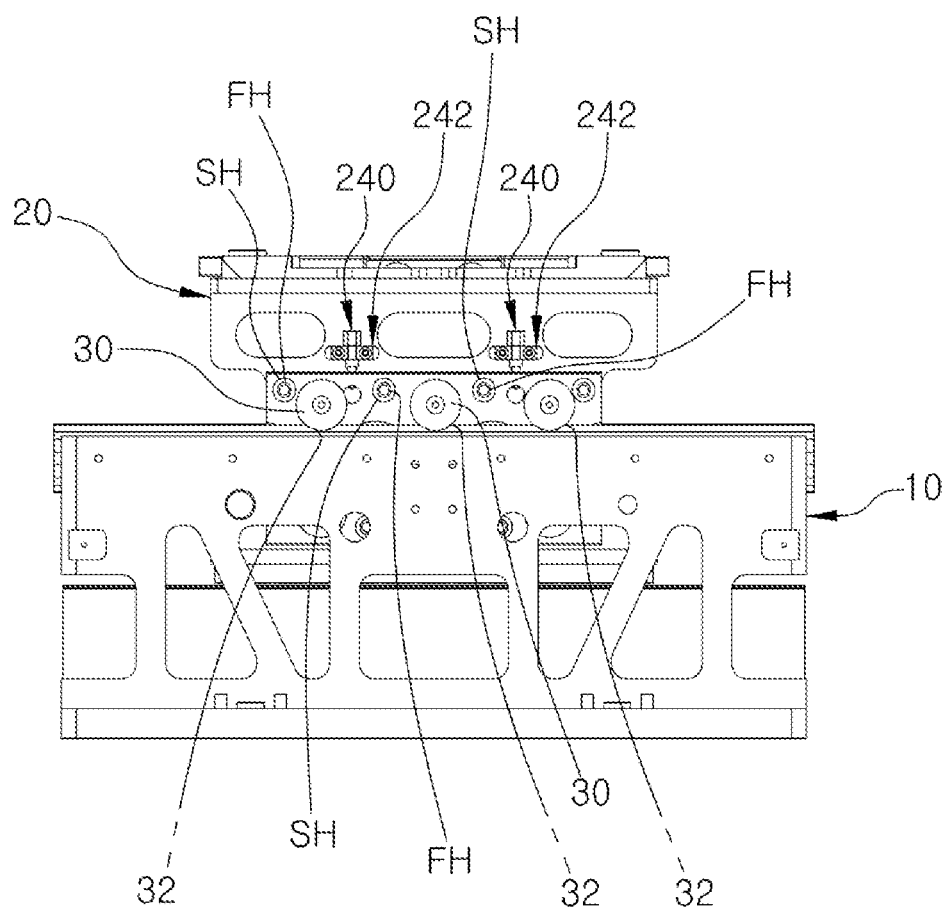

[Figure 3]
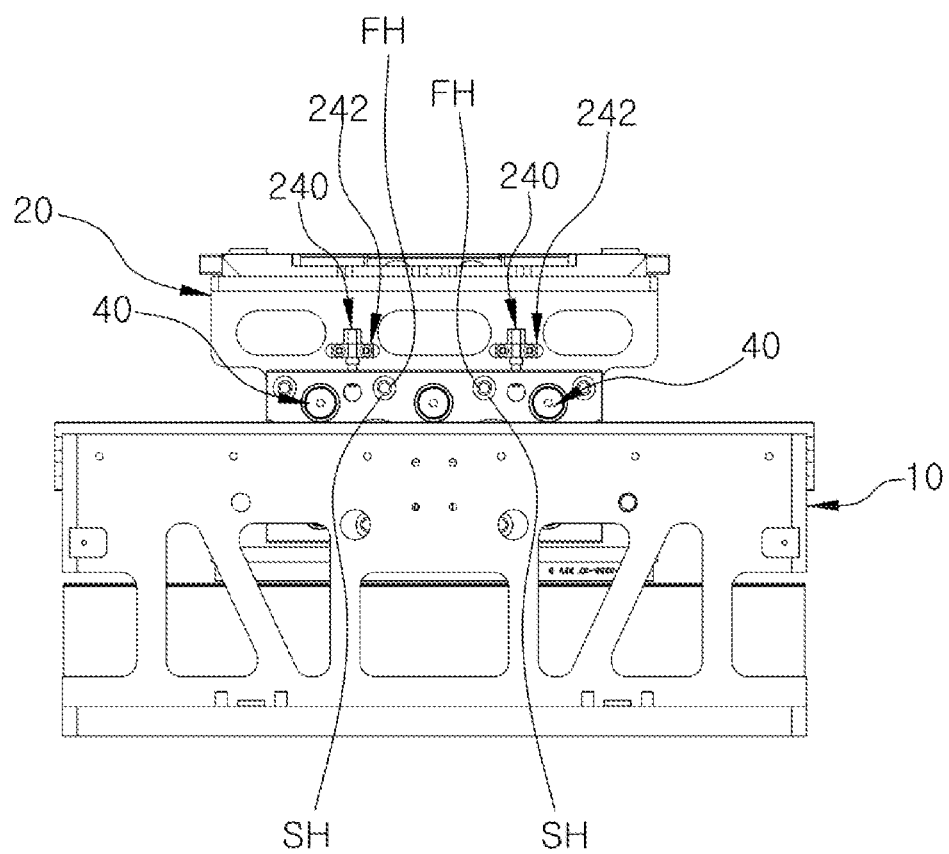

[Figure 4]
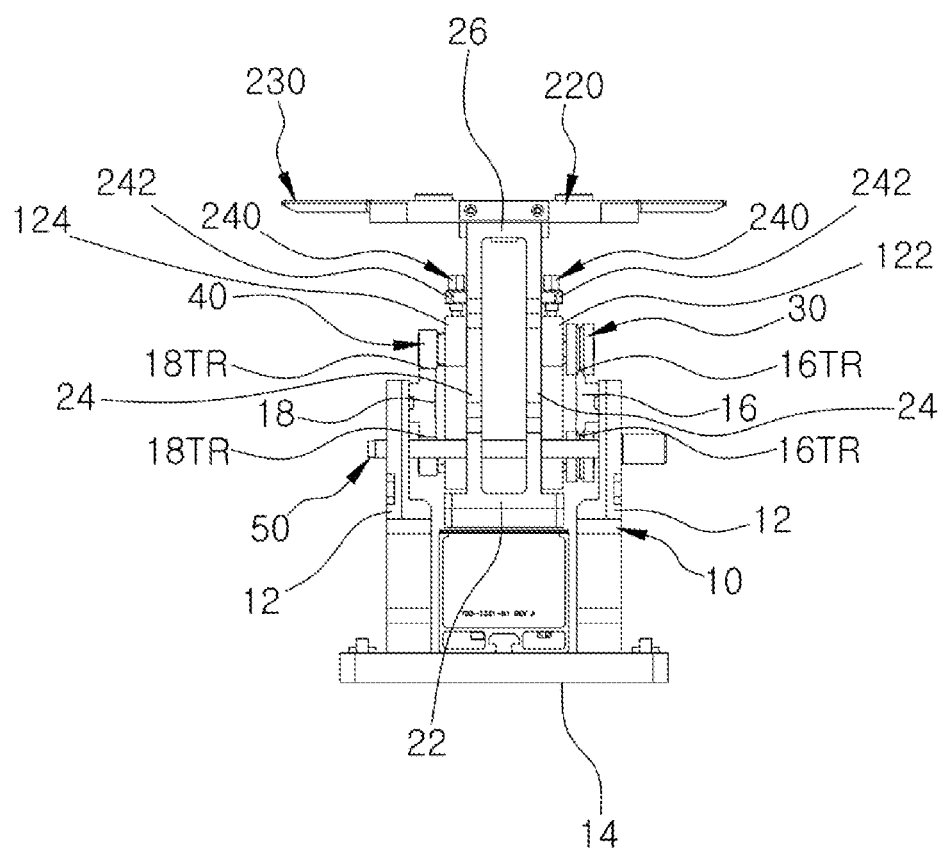

SECONDARY BATTERY MANUFACTURING PROCESS CARRIER HAVING CARRIER TRANSPORTING TRACK STRUCTURE

CROSS REFERENCE TO RELATED APPLICATIONS

This application is a National Stage of International Application No. PCT/KR2020/006752 filed May 25, 2020, claiming priority based on Korean Patent Application No. 10-2019-0065770 filed Jun. 4, 2019.

TECHNICAL FIELD

The present disclosure relates to a secondary battery manufacturing process carrier having a carrier transporting track structure with a novel configuration designed to prevent flatness from being affected by accumulated tolerances attributable to processing tolerances and assembly tolerances.

BACKGROUND ART

A secondary battery has a structure in which an electrode assembly is mounted inside a battery casing, and electrode tabs protrude from both ends or one end of the secondary battery.

A manufacturing process of a secondary battery involves welding respective electrode tabs protruding from a plurality of electrode plates in an overlapped state. For the process of welding the plurality of electrode tabs, an electrode assembly is transported to an electrode tab bonding device using a transport carrier. The plurality of electrode tabs of the electrode assembly transported to the electrode tab bonding device are welded together by fusion bonding to form a single electrode tab protruding from the secondary battery. The electrode tab bonding device welds a plurality of positive electrode tabs and electrode tabs of the electrode assembly for the secondary battery by a method such as fusion bonding or laser bonding.

However, a conventional electrode assembly carrier (J/R CARRIER) has several drawbacks as follows.

The conventional electrode assembly carrier is a carrier-separated type and is an assembly of parts, so assembly tolerances occur.

Accumulated tolerances attributable to machining tolerances and assembly tolerances affect flatness.

Precise track interval setting is required. The conventional electrode assembly carrier is a double V-bearing type and is moved along rails engaged with V-shaped grooves of V bearings, so precise track interval setting is required.

Stick slip occurs depending on rail intervals.

In addition, setting the flatness of an upper surface of the carrier is required to perform various processes in the manufacture of secondary batteries, including welding (bonding) of electrode tabs of the secondary batteries. Conventionally, setting of the flatness involves inserting a shim plate into a shim plate insertion portion of the carrier. After an inner plate and a base plate are disassembled, the shim plate is inserted into the shim plate insertion portion, after which the inner plate and the base plate are reassembled. This process has a problem of requiring a lot of time to set the flatness.

DISCLOSURE

Technical Problem

Accordingly, the present disclosure has been made keeping in mind the above problems occurring in the related art, and an objective of the present disclosure is to provide a secondary battery manufacturing process carrier having a carrier transporting track structure with a novel configuration designed to achieve various advantages such as preventing flatness from being affected by accumulated tolerances attributable to processing tolerances and assembly tolerances, and not requiring precise track interval setting work.

Technical Solution

In order to accomplish the above objective, the present disclosure provides a secondary battery manufacturing process carrier having a carrier transporting track structure according to the present disclosure, the secondary battery manufacturing process carrier including a carrier base; a carrier roller provided at a first side of the carrier base; a rolling member provided at a second side of the carrier base; a first track plate to which the carrier roller is movably coupled; and a second track plate to which the rolling member is movably coupled.

Advantageous Effects

The present disclosure has the following advantages: assembly tolerances can be reduced by the provision of an integrated-type carrier base; assembly time can be reduced; it is not necessary to precisely set the interval between tracks by the provision of V-bearings and rolling members, thereby shortening setting time; interval setting is possible in a state in which a carrier base is seated on tracks, thereby improving convenience; and flatness setting for performing various processes in the manufacture of secondary batteries, including correct welding of electrode tabs of secondary batteries, is possible by the use of bolts, thereby shortening setting time and improving work convenience.

DESCRIPTION OF DRAWINGS

FIG. 1 is a perspective view illustrating a secondary battery manufacturing process carrier according to the present disclosure.

FIG. 2 is a right side view of FIG. 1.
FIG. 3 is a left side view of FIG. 1.
FIG. 4 is a front view of FIG. 1.

BEST MODE

A secondary battery manufacturing process carrier having a carrier transporting track structure according to the present disclosure includes a carrier base; a carrier roller provided at a first side of the carrier base; a rolling member provided at a second side of the carrier base; a first track plate to which the carrier roller is movably coupled; and a second track plate to which the rolling member is movably coupled.

MODE FOR INVENTION

A secondary battery manufacturing process carrier according to the present disclosure includes a carrier base 20 movably disposed on a track base 10, and a carrier roller 30 and a rolling member 40 provided on the carrier base 20.

The track base 10 has a structure in which left and right outer track plates 12 are coupled to a track bottom plate 14. In addition, the track base 10 includes a pair of left and right first and second track plates 16 and parallel to each other in a longitudinal direction thereof. The first track plate 16 has a first track 16TR, and the second track plate 18 has a second track 18TR. The first track 16TR has a V-shaped cross-section. Here, the first track 16TR is composed of an upper first track 16TR and a lower first track 16TR provided at upper and lower ends of the first track plate 16, respectively, and the second track 18TR is composed of an upper second track 18TR and a lower second track 18TR provided at upper and lower ends of the second track plate 18, respectively. When viewed from the front or rear of the track base 10, the upper first track 16TR has an inverted V shape and the lower first track 16TR has a V shape. The upper first track 16TR and the lower first track 16TR are provided at the upper and lower ends of the first track plate 16, respectively. The upper second track 18TR and the lower second track 18TR each having a flat surface structure are provided at the upper and lower ends of the second track plate 18, respectively. That is, the two first tracks 16TR are provided at upper and lower sides of the first track plate 16, and the two second tracks 18TR are provided at upper and lower sides of the second track plate 18.

The carrier base 20 includes a lower carrier base plate 22, a pair of left and right side carrier base plates connected to the lower carrier base plate 22, and an upper carrier base plate 26 connected to the pair of left and right side carrier base plates 24. The carrier base 20 is provided in the form of a hexahedral block. Here, the lower carrier base plate 22, the pair of left and right side carrier base plates 24, and the upper carrier base plate 26 are integrally coupled to each other. The lower carrier base plate 22, the pair of left and right side carrier base plates 24, and the upper carrier base plate 26 may be integrally coupled to each other to form the carrier base 20 by an integral molding method such as extrusion.

A first carrier side plate 122 and a second carrier side plate 124 are provided on the left and right side carrier base plates 24 of the carrier base 20, respectively. The first carrier side plate 122 may be mounted on the left side carrier base plate 24 of the carrier base 20 by coupling a fastener such as a bolt to a setting hole SH provided in the first carrier side plate 122 and a fixing hole FH provided in the left side carrier base plate 24 of the carrier base 20 in a state in which the first carrier side plate 122 is disposed to be in contact with an outer surface of the left side carrier base plate 24 of the carrier base 20. The second carrier side plate 124 may be mounted on the second side carrier base plate 24 of the carrier base 20 by coupling a fastener such as a bolt to a setting hole SH provided in the second carrier side plate 124 and a fixing hole FH provided in the right side carrier base plate 24 of the carrier base 20 in a state in which the second carrier side plate 124 is disposed to be in contact with an outer surface of the right side carrier base plate 24 of the carrier base 20. The setting hole SH is provided in the form of an elongated hole extended by a predetermined length in a vertical direction.

The first carrier side plate 122 has the carrier roller 30. The carrier roller 30 has a carrier groove 32 on an outer circumferential surface thereof. The carrier groove 32 is configured as a V-shaped groove. Alternatively, the carrier groove 32 may be configured as a groove with a curved cross-section or a groove with a rhombic cross-section. The carrier groove 32 may be configured in various shapes.

In addition, a plurality of carrier rollers 30 are provided on the first carrier side plate 122. The plurality of carrier rollers 30 are provided along a longitudinal direction of the first carrier side plate 122. A plurality of upper carrier rollers 30 and lower carrier rollers 30 are provided on the first carrier side plate 122. Since the first carrier side plate 122 is mounted on the left side carrier base plate 24 of the carrier base 20, a structure is formed in which the plurality of upper carrier rollers 30 and lower carrier rollers 30 are disposed at a first side of the carrier base 20.

Respective carrier grooves 32 formed on the outer circumferential surfaces of the carrier rollers 30 are engaged with the first tracks 16TR of the first track plate 16. The first tracks 16TR of the first track plate 16 are inserted into and engaged with the carrier grooves 32 of the carrier rollers 30. Here, since the first carrier side plate 122 has the upper carrier rollers 30 and the lower carrier rollers 30 and the upper first track 16TR and the lower first track 16TR constituting the first track 16TR are respectively provided at the upper and lower ends of the first track plate 16 provided on the track base 10, the carrier grooves 32 of the upper carrier rollers 30 and the carrier grooves 32 of the lower carrier rollers 30 are engaged with the upper first track 16TR and the lower first track 16TR, respectively.

The first tracks 16TR may be configured as protrusion pieces with a curved cross-section and the carrier grooves 32 may be configured as grooves with a curved cross-section, so that the carrier grooves 32 are engaged with the first tracks 16TR.

Alternatively, the first tracks 16TR may be configured as protrusion pieces with a rhombic cross-section and the carrier grooves 32 may be configured as grooves with a rhombic cross-section, so that the carrier grooves 32 are engaged with the first tracks 16TR.

As such, the first tracks 16TR may be configured as protrusion pieces with various cross-sections, and the carrier grooves 32 may be configured as various grooves with cross-sections corresponding to the cross-sections the first tracks 16TR.

The second carrier side plate 124 has the rolling member 40. The rolling member 40 is provided in the form of a circular roller. A plurality of rolling members 40 are provided on the second carrier side plate 124. The plurality of rolling members 40 are provided along a longitudinal direction of the second carrier side plate 124. A plurality of upper rolling members 40 and lower rolling members 40 are rotatably provided on the second carrier side plate 124. Since the second carrier side plate 124 is mounted on the right side carrier base plate 24 of the carrier base 20, a structure is formed in which the plurality of upper rolling members 40 and lower rolling members 40 are disposed at a second side of the carrier base 20.

Respective outer circumferential surfaces of the rolling members 40 are in contact with the second tracks 18TR of the second track plate 18. The second tracks 18TR are provided in the form of flat surfaces provided at the upper and lower ends of the second track plate 18, so that the outer circumferential surfaces of the rolling members 40 are in contact with the second tracks 18TR. Here, since the second carrier side plate 124 has the upper rolling members and the lower rolling members 40 and the upper second track 18TR and the lower second track 18TR constituting the second track 18TR are respectively provided at the upper and lower ends of the second track plate 18 provided on the track base 10, the outer circumferential surfaces of the upper rolling member 40 and the lower rolling members 40 are in contact with the upper second track 18TR and the lower second track 18TR.

The carrier rollers 30 and the rolling members 40 are coupled to the first tracks 16TR of the first track plate 16 of the track base 10 and the second tracks 18TR of the second track plate 18 of the track base 10, respectively, so that the carrier base 20 is movably coupled to the track base 10.

The upper carrier base plate 26 of the carrier base 20 has a pinhole. A plurality of pinholes are provided in the upper carrier base plate 26. Two pinholes are provided in the upper carrier base plate 26 at respective positions adjacent to front and rear ends of the upper carrier base plate 26. A pin is press-fitted into the pinhole. A plurality of pins are press-fitted into the plurality of pinholes. Two pins are press-fitted to the upper carrier base plate 26.

A base plate 220 is placed on the upper carrier base plate 26 of the carrier base 20. The base plate 220 has pin insertion holes. The pin insertion holes are fitted over the pins press-fitted to the upper carrier base plate 26. The base plate 220 is placed on the upper carrier base plate 26 and set in position.

Alternatively, the upper carrier base plate 26 may have a step portion on an upper surface thereof so that and the base plate 220 is set on the upper carrier base plate 26 by being supported by the step portion.

The base plate 220 has a recess. An inner plate 230 is received in the recess. An electrode assembly (a positive electrode plate and a negative electrode plate are stacked with a separator interposed therebetween) for a secondary battery is placed on the inner plate 230.

A fixing pin 50 is coupled to the track base 10 and the carrier base 20. Each of the left and right side carrier base plates 24 constituting the carrier base 20 has a pinhole, and each of the left and right outer track plates 12 constituting the track base 10 has a track base pinhole, so that the fixing pin 50 is inserted into the respective pinholes and the respective track base pinholes. The fixing pin 50 fixes the carrier base 20 to the track base 10 so that the carrier base 20 is prevented from being shaken during initial setting, thereby improving convenience during initial setting.

In a state in which the fixing pin 50 is inserted into the pinholes of the carrier base 20 and the track base pinholes, the track base 10 is fixed to the carrier base 20. In a state in which the fixing pin 50 is removed from the pinholes of the carrier base 20 and the track base pinholes, the carrier base 20 is movable along the track base 10.

According to the present disclosure having the above configuration, the track base 10 is extended to an electrode tab bonding device that welds electrode tabs of the electrode plates constituting the electrode assembly for the secondary battery. Therefore, when the carrier base 20 is transported along the track base 10 in a state in which the electrode assembly for the secondary battery is placed on the inner plate 230 coupled to the carrier base 20, the electrode assembly is transported to the electrode tab bonding device together with the base plate 220 and the inner plate 230, and then the electrode tabs protruding from the electrode assembly are welded together by the electrode tab bonding device, thereby manufacturing a secondary battery in which electrode tabs protrude from a pouch. A secondary battery manufacturing process includes various processes other than the process for welding the electrode tabs. The track base 10 is extended to various process units of a secondary battery manufacturing apparatus so that the carrier base 20 is moved to the process units for performing the various processes.

As the carrier rollers 30 with the carrier grooves 32 are rolled along the first tracks 16TR of the track base 10 and the rolling members 40 are rolled along the second tracks 18TR of the track base 10, the carrier base 20 is moved along the track base 10.

Meanwhile, the present disclosure further includes an adjuster bolt 240 provided between the first carrier side plate 122 and the carrier base 20 among the first carrier side plate 122 and the second carrier side plate 124 disposed at left and right sides of the carrier base 20. Preferably, the adjuster bolt 240 is provided between the carrier base 20 and each of the first carrier side plate 122 and the second carrier side plate 124 disposed at the left and right sides of the carrier base 20.

The carrier base 20 has a bolt support piece 242. The bolt support piece 242 is provided on each of the left and right side carrier base plates 24 constituting the carrier base 20. A plurality of bolt support pieces 242 are provided on each of the left and right side carrier base plates 24 constituting the carrier base 20. In the present disclosure, two bolt support pieces 242 are provided on each of the left and right side carrier base plates 24 of the carrier base 20. Each of the bolt support pieces 242 has a bracket structure having a bolt coupling hole therein. The bolt coupling hole is formed through the bolt support piece 242 in a vertical direction thereof. The setting hole SH provided in the first carrier side plate 122 and the setting hole SH provided in the second carrier side plate 124 are provided in the form of elongated holes extended in vertical directions of the first carrier side plate 122 and the second carrier side plate 124, respectively.

The adjuster bolt 240 is rotatably coupled to each of the bolt support pieces 242 provided on the carrier base 20. The adjuster bolt 240 is rotatably coupled to the bolt coupling hole. The adjuster bolt 240 is screwed into a bolt hole provided in the first carrier side plate 122. The bolt hole is formed through an upper end of the first carrier side plate 122 disposed outside the left side carrier base plate 24 among the left and right side carrier base plates 24 of the carrier base 20, so that the adjuster bolt 240 is screwed into the bolt hole of the first carrier side plate 122. A plurality of adjuster bolts 240 are screwed into a plurality of bolt holes formed in the first carrier side plate 122. Alternatively, a lower end of each of the adjuster bolts 240 may be configured to be in contact with the upper end of the first carrier side plate 122. In the present disclosure, two adjuster bolts 240 are screwed into two bolt holes provided in the first carrier side plate 122. In this case, the two adjuster bolts 240 may be configured to be in contact with the upper end of the first carrier side plate 122. In addition, another adjuster bolt 240 is screwed into a bolt hole provided in the second carrier side plate 124. The bolt hole is formed through an upper end of the second carrier side plate 124 disposed outside the right side carrier base plate 24 among the left and right side carrier base plates 24 of the carrier base 20, so that the adjuster bolt 240 is screwed into the bolt hole of the second carrier side plate 124. A plurality of adjuster bolts 240 are screwed into a plurality of bolt holes formed in the first carrier side plate 124. Alternatively, a lower end of each of the adjuster bolts 240 may be configured to be in contact with the upper end of the second carrier side plate 124. In the present disclosure, two adjuster bolts 240 are screwed into two bolt holes provided in the second carrier side plate 124. In this case, a lower end of each of the two adjuster bolts 240 may be configured to be in contact with the upper end of the second carrier side plate 124.

The flatness of the base plate 220 mounted on the carrier base 20 and the inner plate 230 on which the electrode assembly is placed are adjusted by rotating the adjuster bolts 240.

Since the setting holes SH provided in the first carrier side plate 122 and the second carrier side plate 124 are elongated holes extended in the vertical direction, when the adjuster bolts 240 are turned in a state in which fasteners such as bolts tightened in the fixing holes FH provided in the left and right side carrier base plates 24 of the carrier base 20 are loosened, the carrier base 20 is allowed to be moved together with the fasteners in the vertical direction, so that the flatness is adjusted.

When the adjuster bolt 240 positioned on the left side in the drawings when viewed from the front of the first carrier side plate 122 is turned in one direction, a first end of the carrier base 20 is lifted with respect to the first carrier side plate 122. When the adjuster bolt 240 positioned on the left side in the drawings is turned in the opposite direction, the first end of the carrier base 20 is lowered with respect to the first carrier side plate 122. By these operations, the flatness of the base plate 220 and the inner plate 230 mounted on the carrier base 20 are adjusted.

When the adjuster bolt 240 positioned on the right side in the drawings when viewed from the front of the first carrier side plate 122 is turned in one direction, a second end of the carrier base 20 is lifted with respect to the first carrier side plate 122. When the adjuster bolt 240 positioned on the right side in the drawings is turned in the opposite direction, the second end of the carrier base 20 is lowered with respect to the first carrier side plate 122. By these operations, the flatness of the base plate 220 and the inner plate 230 mounted on the carrier base 20 are adjusted.

In addition, when the adjuster bolt 240 positioned on the left side in the drawings when viewed from the front of the second carrier side plate 124 is turned in one direction, the first end of the carrier base 20 is lifted with respect to the second carrier side plate 124. When the adjuster bolt 240 positioned on the right side in the drawings is turned in the opposite direction, the first end of the carrier base 20 is lowered with respect to the second carrier side plate 124. By these operations, the flatness of the base plate 220 and the inner plate 230 mounted on the carrier base 20 are adjusted.

When the adjuster bolt 240 positioned on the right side in the drawings when viewed from the front of the second carrier side plate 124 is turned in one direction, the second end of the carrier base 20 is lifted with respect to the second carrier side plate 124. When the adjuster bolt 240 positioned on the right side in the drawings is turned in the opposite direction, the second end of the carrier base 20 is lowered with respect to the second carrier side plate 124. By these operations, the flatness of the base plate 220 and the inner plate 230 mounted on the carrier base 20 are adjusted.

As described above, by the operations of turning the adjuster bolts provided between the first carrier side plate 122 disposed at the left side of the carrier base 20 and the left side carrier base plate 24 of the carrier base 20 and turning the adjuster bolts provided between the second carrier side plate 124 and the right side carrier base plate 24 of the carrier base 20, it is possible to adjust the height of front and rear ends of the carrier base 20 and the height between lateral ends of the carrier base 20, thereby adjusting the flatness of the base plate 220 and the inner plate 230 mounted on the carrier base 20. Meanwhile, after adjusting the flatness of the base plate 220 and the inner plate 230 of the carrier base 20 by manipulating the adjuster bolts 240, the fasteners such as bolts loosened in the fixing holes FH and the setting holes SH may be re-tightened to maintain the adjusted flatness.

The advantages of the secondary battery manufacturing process carrier according to the present disclosure of the above configuration are as follows.

By the provision of the integrated-type carrier base 20, assembly tolerances can be reduced and the assembly time can be shortened. The carrier base 20 includes the lower carrier base plate 22, the pair of left and right side carrier base plates 24, and the upper carrier base plate 26. Here, the lower carrier base plate 22, the pair of left and right side carrier base plates 24, and the upper carrier base plate 26 are integrally coupled to each other. By this structure, it is possible to reduce assembly tolerances and shorten the assembly time.

The carrier rollers 30 with the carrier grooves and the rolling members 40 are moved along the first tracks 16TR and the second tracks 18TR of the track base 10, so precise interval setting is not necessary. By the provision of the carrier rollers 30 and the rolling members 40, it is not necessary to precisely set the interval between the first tracks 16TR and the second tracks 18TR, thereby shortening the setting time. In addition, by the provision of the carrier rollers 30 with the carrier grooves 32 of various shapes such as V-shaped grooves and the rolling members 40, the carrier grooves 32 of the carrier rollers 30 and the rolling members 40 are easily engaged with the first tracks 16TR and the second tracks 18TR of the track base 10, respectively. Therefore, precise setting of the interval between the first tracks 16TR and the second tracks 18TR of the track base 10 is not necessary, resulting in a shortened setting time.

Interval setting is possible in a state in which the side carrier base plates 24 are seated on the track base 10, thereby improving convenience.

Flatness setting is possible by the use of bolts, thereby shortening the setting time and improving work convenience. The flatness setting is possible by the use of the adjuster bolts 240 as described above, resulting in a shortened setting time and improved work convenience. The flatness is set on the basis of the flatness of the inner plate, and the flatness is adjusted by the use of the adjuster bolts 240. That is, by setting the flatness on the basis of the flatness of the inner plate by the use of bolts, setting time can be shortened.

When the flatness is needed to be adjusted by the use of the adjuster bolts 240, the fixing pin 50 is inserted and coupled to the carrier base 20 and the track base 10 to prevent the carrier base 20 from being moved in the track base 10. By preventing the carrier base 20 from being moved in the track base 10 during flatness adjustment, the flatness adjustment operation can be performed more stably and conveniently.

The fixing holes FH are provided in the side carrier base plates 24 of the carrier base 20 to add a fastening force, and the setting holes SH are provided in the first carrier side plate 122 and the second carrier side plate 124. This enables setting the flatness without disassembling the track base 10. The fixing pin 50 is provided to facilitate bolt fastening when setting the side carrier base plates 24 so that the carrier base 20 is fixed in position without being moved during setting, thereby increasing work convenience. By the provision of the fixing pin 50, it is possible to improve convenience during initial setting.

INDUSTRIAL APPLICABILITY

A secondary battery manufacturing process carrier having a carrier transporting track structure according to the present disclosure includes a carrier base; a carrier roller provided at a first side of the carrier base; a rolling member provided at a second side of the carrier base; a first track plate to which the carrier roller is movably coupled; and a second track plate to which the rolling member is movably coupled. With this configuration, the present disclosure has industrial applicability.

The invention claimed is:

1. A secondary battery manufacturing process carrier having a carrier transporting track structure, the secondary battery manufacturing process carrier comprising:
   a carrier base;
   a carrier roller and a rolling member provided on the carrier base;
   a track base on which the carrier base is movably disposed, wherein the track base comprises:
      a first track plate to which the carrier roller is movably coupled; and
      a second track plate to which the rolling member is movably coupled,
      wherein a first carrier side plate and a second carrier side plate are respectively disposed at left and right sides of the carrier base, the carrier roller and the rolling member are respectively provided on the first carrier side plate and the second carrier side plate, and the carrier roller and the rolling member are configured to be rolled on the track base and to be contacting the track base, and
      wherein the carrier base comprises a lower carrier base plate, a pair of left and right side carrier base plates, and an upper carrier base plate, wherein the lower carrier base plate, the pair of left and right side carrier base plates, and the upper carrier base plate are integrally coupled to each other.

2. The secondary battery manufacturing process carrier of claim 1, wherein the track base has first and second track plates parallel to each other in a longitudinal direction thereof, the first track plate has a first track, the second track plate has a second track, and the carrier roller provided on the carrier base has a carrier groove on an outer circumferential surface thereof.

3. The secondary battery manufacturing process carrier of claim 2, wherein the carrier roller is rolled in a state in which the carrier groove of the carrier base is engaged with the first track of the track base, and the rolling member of the carrier base is rolled in a state in which an outer circumferential surface thereof is in contact with the second track of the track base.

4. The secondary battery manufacturing process carrier of claim 3, wherein the first track is configured in a shape with a V-shaped cross-section and the carrier groove is configured as a V-shaped groove, so that the carrier groove is engaged with the first track.

5. The secondary battery manufacturing process carrier of claim 3, wherein a plurality of carrier rollers and a plurality of rolling members are provided on the carrier base.

6. The secondary battery manufacturing process carrier of claim 2, wherein the first track includes an upper first track and a lower first track respectively provided at upper and lower ends of the first track plate of the track base, the second track includes an upper second track and a lower second track respectively provided at upper and lower ends of the second track plate of the track base, the carrier roller includes an upper carrier roller and a lower carrier roller disposed in a vertical direction at a first side of the carrier base, and the rolling member includes an upper rolling member and a lower rolling member provided at a second side of the carrier base.

7. The secondary battery manufacturing process carrier of claim 1, wherein another base plate is placed on the upper carrier base plate, and wherein the upper carrier base plate has a pinhole allowing a pin to be press-fitted thereinto and the another base plate has a pin insertion hole, so that the another base plate is set on the upper carrier base plate by fitting the pin insertion hole over the pin.

8. The secondary battery manufacturing process carrier of claim 7, wherein the upper carrier base plate has a step portion, so that the another base plate is set on the upper carrier base plate by being supported by the step portion.

9. The secondary battery manufacturing process carrier of claim 1, wherein each of the first carrier side plate and the second carrier side plate has a setting hole (SH), and each of the left and right side carrier base plates of the carrier base has a fixing hole (FH) corresponding to the setting hole (SH).

10. The secondary battery manufacturing process carrier of claim 1, further comprising a fixing pin coupled to the track base and the carrier base.

* * * * *